(12) United States Patent
Schudt et al.

(10) Patent No.: US 11,456,099 B2
(45) Date of Patent: Sep. 27, 2022

(54) ELECTROMAGNETIC ACTUATING DEVICE

(71) Applicant: Robert Bosch GmbH, Stuttgart (DE)

(72) Inventors: Klaus Schudt, Nordheim (DE); Tilo Hofmann, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/710,905

(22) Filed: Dec. 11, 2019

(65) Prior Publication Data
US 2020/0203049 A1 Jun. 25, 2020

(30) Foreign Application Priority Data
Dec. 20, 2018 (DE) .......................... 102018222614.8

(51) Int. Cl.
| | | |
|---|---|---|
| *H01F 3/00* | (2006.01) | |
| *H01F 7/16* | (2006.01) | |
| *H01F 7/08* | (2006.01) | |
| *H01F 7/129* | (2006.01) | |
| *F16K 31/06* | (2006.01) | |
| *F16D 27/00* | (2006.01) | |
| *F16D 25/12* | (2006.01) | |

(52) U.S. Cl.
CPC .............. *H01F 7/16* (2013.01); *H01F 7/081* (2013.01); *H01F 7/129* (2013.01); *F16D 25/12* (2013.01); *F16D 27/00* (2013.01); *F16K 31/0675* (2013.01)

(58) Field of Classification Search
CPC . H01F 7/16; H01F 7/081; H01F 7/129; H01F 2007/08; H01F 7/1607; F16D 25/12; F16D 27/00; F16K 31/0675; F16H 61/28; F16H 61/0202

USPC ......................................................... 335/279
See application file for complete search history.

(56) References Cited

U.S. PATENT DOCUMENTS

| | | | | |
|---|---|---|---|---|
| 4,974,495 A * | 12/1990 | Richeson, Jr. | ............ | F01L 9/10 91/459 |
| 5,022,358 A * | 6/1991 | Richeson | ................ | F01L 1/465 123/90.12 |
| 5,127,585 A * | 7/1992 | Mesenich | .......... | F02M 51/0621 239/585.5 |
| 5,246,033 A * | 9/1993 | Brehm | ................ | F16H 61/0251 137/625.27 |
| 5,447,288 A * | 9/1995 | Keuerleber | ........ | G05D 16/2022 251/129.17 |
| 5,924,675 A * | 7/1999 | Hussey | .................. | F02M 26/68 251/129.15 |
| 5,947,092 A * | 9/1999 | Hussey | ................ | F02M 63/022 123/568.26 |

(Continued)

FOREIGN PATENT DOCUMENTS

DE 102012223430 A1 6/2014

*Primary Examiner* — Shawki S Ismail
*Assistant Examiner* — Lisa N Homza
(74) *Attorney, Agent, or Firm* — Norton Rose Fulbright US LLP; Gerard Messina

(57) ABSTRACT

An electromagnetic actuating device includes a pole tube that is substantially cylindrical overall, an armature situated radially inside the pole tube, and an electromagnetic coil situated radially outside the pole tube, the pole tube having a first axial end and a second axial end. The pole tube is configured as a sleeve that is stamped and is brought into its shape by reshaping, the sleeve having, close to its first axial end, openings that extend in the circumferential direction.

22 Claims, 4 Drawing Sheets

(56) References Cited

U.S. PATENT DOCUMENTS

| | | | | |
|---|---|---|---|---|
| 5,950,605 A * | 9/1999 | Hussey | F02M 26/68 | 123/568.26 |
| 6,279,524 B1 * | 8/2001 | Schebitz | H01F 7/088 | 123/90.11 |
| 6,378,545 B1 * | 4/2002 | Bozkan | F15B 13/0405 | 137/82 |
| 6,543,744 B2 * | 4/2003 | Carrillo | F02M 25/0836 | 251/129.08 |
| 6,659,424 B2 * | 12/2003 | Buse | F02M 37/0023 | 251/129.15 |
| 2002/0053840 A1 * | 5/2002 | Oelsch | H02K 5/124 | 310/67 R |
| 2002/0113220 A1 * | 8/2002 | Buse | F02M 69/54 | 251/129.15 |
| 2002/0190234 A1 * | 12/2002 | Carrillo | F02M 25/0836 | 251/129.08 |
| 2008/0265190 A1 * | 10/2008 | Fleischer | G05D 16/2024 | 251/65 |
| 2009/0090881 A1 * | 4/2009 | Mueller | F16K 31/062 | 251/129.14 |
| 2009/0267009 A1 * | 10/2009 | Hofmann | F16K 31/0689 | 251/129.15 |
| 2010/0127197 A1 * | 5/2010 | Fleischer | F16K 31/0655 | 251/129.15 |
| 2012/0031362 A1 * | 2/2012 | Bender | F01L 1/34 | 123/90.18 |
| 2012/0048398 A1 * | 3/2012 | Schudt | F16K 31/0613 | 137/514 |
| 2012/0048400 A1 * | 3/2012 | Schudt | F16K 31/0613 | 137/528 |
| 2012/0104293 A1 * | 5/2012 | Fleischer | F15B 13/0402 | 251/129.01 |
| 2014/0027545 A1 * | 1/2014 | Graner | F02M 51/0682 | 239/585.1 |
| 2015/0102134 A1 * | 4/2015 | Filippi | F02M 61/168 | 239/584 |
| 2015/0176700 A1 * | 6/2015 | Schudt | F16H 61/0206 | 137/625.65 |
| 2015/0332834 A1 * | 11/2015 | Schudt | H01F 7/127 | 335/282 |
| 2015/0354516 A1 * | 12/2015 | Izzo | F02M 41/00 | 123/445 |
| 2015/0354715 A1 * | 12/2015 | Schudt | B01D 35/02 | 210/435 |
| 2016/0024976 A1 * | 1/2016 | Lang | F01L 1/34 | 123/90.12 |
| 2016/0172091 A1 * | 6/2016 | Ott | H01F 7/1615 | 335/229 |
| 2017/0282359 A1 * | 10/2017 | Higuchi | B25J 9/1679 | |
| 2018/0151282 A1 * | 5/2018 | Klenk | F16K 47/00 | |
| 2018/0372043 A1 * | 12/2018 | Izzo | F02M 51/066 | |
| 2019/0244738 A1 * | 8/2019 | Klenk | H01F 7/081 | |
| 2020/0118724 A1 * | 4/2020 | Sen | H01F 7/081 | |
| 2020/0203049 A1 * | 6/2020 | Schudt | H01F 7/081 | |
| 2020/0203105 A1 * | 6/2020 | Schudt | H01H 50/18 | |
| 2021/0156489 A1 * | 5/2021 | Schudt | H01F 7/081 | |
| 2021/0172544 A1 * | 6/2021 | Belzner | F16C 33/124 | |

* cited by examiner

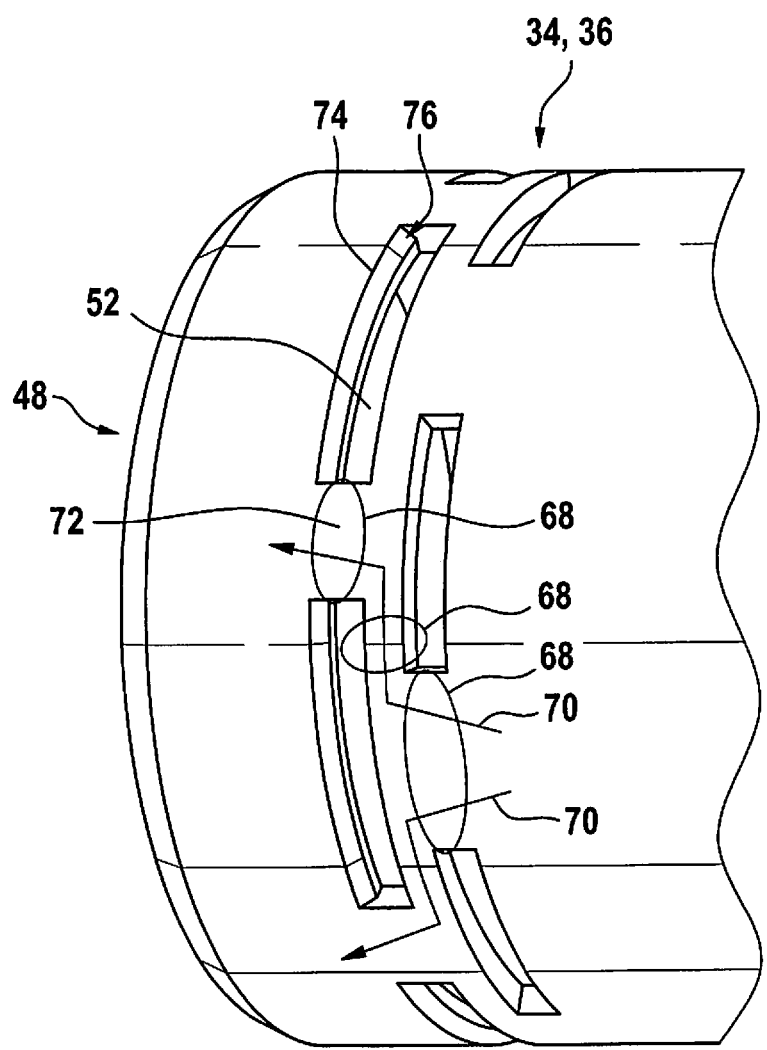

ELECTROMAGNETIC ACTUATING DEVICE

RELATED APPLICATION INFORMATION

The present application claims priority to and the benefit of German patent application no. DE 10 2018 222 614.8, which was filed in Germany on Dec. 20, 2018, the disclosure of which is incorporated herein by reference.

FIELD OF THE INVENTION

The present invention relates to an electromagnetic actuating device.

BACKGROUND INFORMATION

In passenger vehicle automatic transmissions, hydraulically actuated clutches are used to change gears, the hydraulic pressure at the clutches being set by hydraulic slide valves. Slide valves can be actuated via a pilot valve (pre-controlling), or can be actuated directly via an electromagnetic actuating device. In such actuating devices, in practice embodiments have proved successful that have a pole tube, i.e. the magnetic armature is guided in a pole tube. A significant emphasis of development is to achieve as high as possible a level of magnetic force (large stroke work), i.e., the magnetic efficiency has to be brought to a high level. Such an actuating device having a pole tube is discussed in DE 10 2012 223 430 A1, in which the pole tube has a "magnetic separation" realized as a thin point of rotation. The thinly rotated point reaches saturation already at a low magnetic flux level, and then acts as a magnetic block. However, the realization of the magnetic separation is associated with a certain outlay during manufacture.

SUMMARY OF THE INVENTION

The underlying problem of the present invention is solved by an electromagnetic actuating device having the features of claim 1. Advantageous developments of the present invention are indicated in subclaims.

According to the present invention, an electromagnetic actuating device is proposed that has a substantially cylindrical pole tube, an armature (magnetic armature) situated radially inside the pole tube, and an electromagnetic coil situated radially outside the pole tube. It will be understood that "substantially cylindrical" encompasses that the pole tube can include collars, projections, grooves, changes in wall thickness, etc., but overall is realized in the manner of a cylinder, or a tube. The armature can be guided immediately or indirectly inside the pole tube, for example by a sliding seat. By activating the electromagnetic coil, the armature can be displaced along its longitudinal direction in the electromagnetic actuating device. This corresponds to the classical configuration of an electromagnetic actuating device.

The pole tube has a first axial end and a second axial end. The pole tube is configured as a sleeve (magnetic sleeve) that is stamped and reshaped into its (substantially cylindrical) shape, the sleeve having openings that extend in the circumferential direction close to the first axial end (in the first end region).

Due to the fact that the sleeve (magnetic sleeve) is stamped and brought to its (cylindrical) shape through reshaping, the sleeve can be made from a comparatively thin sheet. In this way, for the magnetic separation a particularly small cross-section can be realized, having a comparatively thinner wall thickness than for example sleeves (magnetic sleeves) produced by machining, in which, because of the production technique, significantly greater wall thicknesses are required. Before the reshaping of the sleeve, in the flat state, openings can easily be formed, for example by laser cutting or by stamping (stamped-out openings). The stamped-out openings can be realized directly during the stamping of the sleeve for example from sheet metal (sleeve cutting, for example unwinding, and stamping out can be realized in one working step). The cross-section in the magnetic separation can be further reduced in this way without requiring costly additional processes.

In this way a pole tube magnet having an improved magnetic efficiency can be produced at low cost. Costly manufacturing processes can be avoided, and low-cost components can be used. The magnetic efficiency can be optimized through particularly favorable realization of the magnetic separation.

The armature, the sleeve (magnetic sleeve), and the electromagnetic coil are configured so as to (axially) overlap with one another. The electromagnetic actuating device can in particular be an electromagnetic actuating element or an electromagnetic actuator ("electromagnet"). The sleeve (magnetic sleeve) can perform one or more of the following tasks: armature guidance, conducting the magnetic flux into the armature, magnetic separation, and/or realizing the magnetic pole at the pole tube side.

According to a development, the sleeve can be made of magnetically conductive steel, in particular magnetically conductive unalloyed steel having a carbon content of less than 0.15 mass percent (<0.15% carbon content). In this way, a realization of the sleeve from material having good magnetic conductivity can be achieved. This contributes to favorable magnetic properties.

According to a development, the sleeve can have a material thickness (sheet thickness) of less than 0.8 millimeters (<0.8 mm), in particular a material thickness (sheet thickness) of from 0.2 to 0.5 millimeters (material thickness of the reshaped, for example cylindrical, sleeve). Such a wall thickness achieves an optimal compromise between producibility of the sleeve and a remaining cross-section for the magnetic separation.

According to a development, the sleeve can be rolled or deep-drawn. In other words, the sleeve can be reshaped by rolling or deep drawing, i.e. can be brought to its substantially cylindrical shape through rolling or through deep drawing. In deep drawing, the sleeve is deep-drawn to its substantially cylindrical shape (seamless sleeve). The openings (magnetic separation) can optionally be made after the deep drawing, for example by laser cutting or stamping. In rolling, the sleeve can be produced by stamping and rolling, the sleeve having a seam in its jacket surface (seam between the free ends; sleeve with seam). The openings (magnetic separation) can optionally be formed directly during the stamping of the initial material of the sleeve, for example from sheet metal. This contributes to a constructively simple and low-cost manufacture of the sleeve. The sleeve seam can extend along the longitudinal direction of the sleeve (axially oriented seam).

According to a development, the rolled sleeve can be latched at the seam. This increases the stability, or shape stability, of the sleeve. The risk of sharp-edged projections on the inside of the sleeve (armature guide) is reduced in this way. The latching can also be formed directly during the stamping of the basic material of the sleeve, for example from sheet metal. The latching can have a projection at one seam end of the sleeve, and at the other seam end of the sleeve can have a recess that corresponds to, in particular is complementary to, the projection. The projection and recess can engage with one another in the manner of pieces of a puzzle.

According to a development, the (rolled) sleeve can have at its first axial end a recess that is open towards the first end and that expands, in particular in a conical manner, towards the first end. This can be a recess that is V-shaped when seen from the top. The recess can be formed as an open seam in the region of the overlap with the pole core. Optionally, the recess can go out from an opening or a stamped-out part. Such a recess facilitates the process of joining with other components, for example with a pole core. In addition, in this way a flow connection (oil duct) between the armature end faces is promoted, for an exchange of oil that acts to dampen the armature movement.

According to a development, the openings can be configured in the circumferential direction in at least one row, and in particular, given a plurality of rows of openings, the openings of adjacent rows can be configured offset to one another in the circumferential direction. Through the openings configured in a row in the circumferential direction, a magnetic separation is created in an axial region. Through the offset configuration in the circumferential direction of the openings in a plurality of rows, there result a plurality of magnetic bottlenecks connected in series. The openings can be stamped-out openings as described above.

According to a development, the length of the openings in the circumferential direction can be at least 50% of the length of the web remaining between two openings that succeed one another in a row. In this way, an adequate reduction of the sleeve cross-section for the magnetic separation is created. The openings can be stamped-out openings.

According to a development, the openings situated axially closest to the first end can have, on the edge of the openings facing the first end, a bevel, in particular a conical one, running axially inward (away from the first end of the sleeve), in particular having a remaining wall thickness of less than 0.3 mm at the tip of the bevel. In other words, there can be a stamped-on bevel or a stamping at the sleeve opening. The openings can be realized as stamped-out openings, where the stamping, or bevel, can be formed during the stamping. The bevel, or the stamping, at the sleeve opening can produce a "pointed" contour. This is advantageous for influencing the course of the magnetic force. In addition, the useful stroke work of the electromagnet can be further increased.

According to a development, the sleeve can have, on its inner circumference, a fiberglass foil that is coated with PTFE (polytetrafluoroethylene) at least in some segments, which may be completely, in order to guide the armature. The coated fiberglass foil is fastened, for example by gluing, in particular on the inner circumference of the sleeve. Positive sliding properties can be achieved by the coated fiberglass foil as bearing element for the armature.

Alternatively, for this purpose the sleeve can have on its inner circumference, and/or the armature can have on its outer circumference, at least in some segments and which may be completely, a magnetically non-conductive coating, in particular a nickel layer or a nickel-phosphorus layer. This can also achieve positive sliding properties.

According to a development, a pole core can be provided, and the sleeve and/or the armature can axially overlap the pole core. In addition to an axially space-saving configuration, in this way a guiding of the sleeve and/or armature by the pole core can also take place. The pole core can have an (axial) recess in which the sleeve and/or armature engage, for example with a first axial end region. The pole core can be realized in one piece.

According to a development, a separate pole sleeve can be provided that is situated radially outside the pole core and surrounds this core radially outwardly over an axial segment, the sleeve (magnetic sleeve) in particular extending into the axial segment and being situated radially between the pole core and the pole sleeve. This contributes to a low-cost production of the pole core and pole sleeve, because these can be realized for example as stamped parts.

The electromagnetic actuating device can have further components. Thus, the electromagnetic actuating device can have a housing (magnetic housing) in which the components of the actuating device are housed. At an end face, in particular an end face facing the pole core, the actuating device can be closed by a terminating piece that can be a flow plate. At the opposite end face, in particular at the end face facing away from the pole core, the actuating device can be closed by a cover that can be made in one piece with a magnetic core. The magnetic core can have a segment that extends into the interior of the housing. In order to connect the electromagnetic actuating device, an electrical contacting can be provided that is electrically connected to the electromagnetic coil, for example a socket segment or a plug segment situated on the housing. An actuating element, for example an actuating pin, can be set into the pole core, which element is guided through a passage formed concentrically in the pole core. The actuating element can have a shaft segment and a radially expanded head segment with which it lies on the inner side of the passage at the pole core. The armature can have a centric axial passage into which an armature bolt is pressed. The armature bolt can work together with the actuating pin, in particular with the head segment of the actuating pin. From radially inward to radially outward, the components can be configured as follows: armature, pole tube, magnetic core segment, coil, magnet housing.

In the following, possible specific embodiments of the present invention are explained with reference to the drawings.

BRIEF DESCRIPTION OF THE DRAWINGS

FIG. 3 shows an enlarged view of the perspective top view of the sleeve of FIG. 2a.

DETAILED DESCRIPTION

Figure 1:
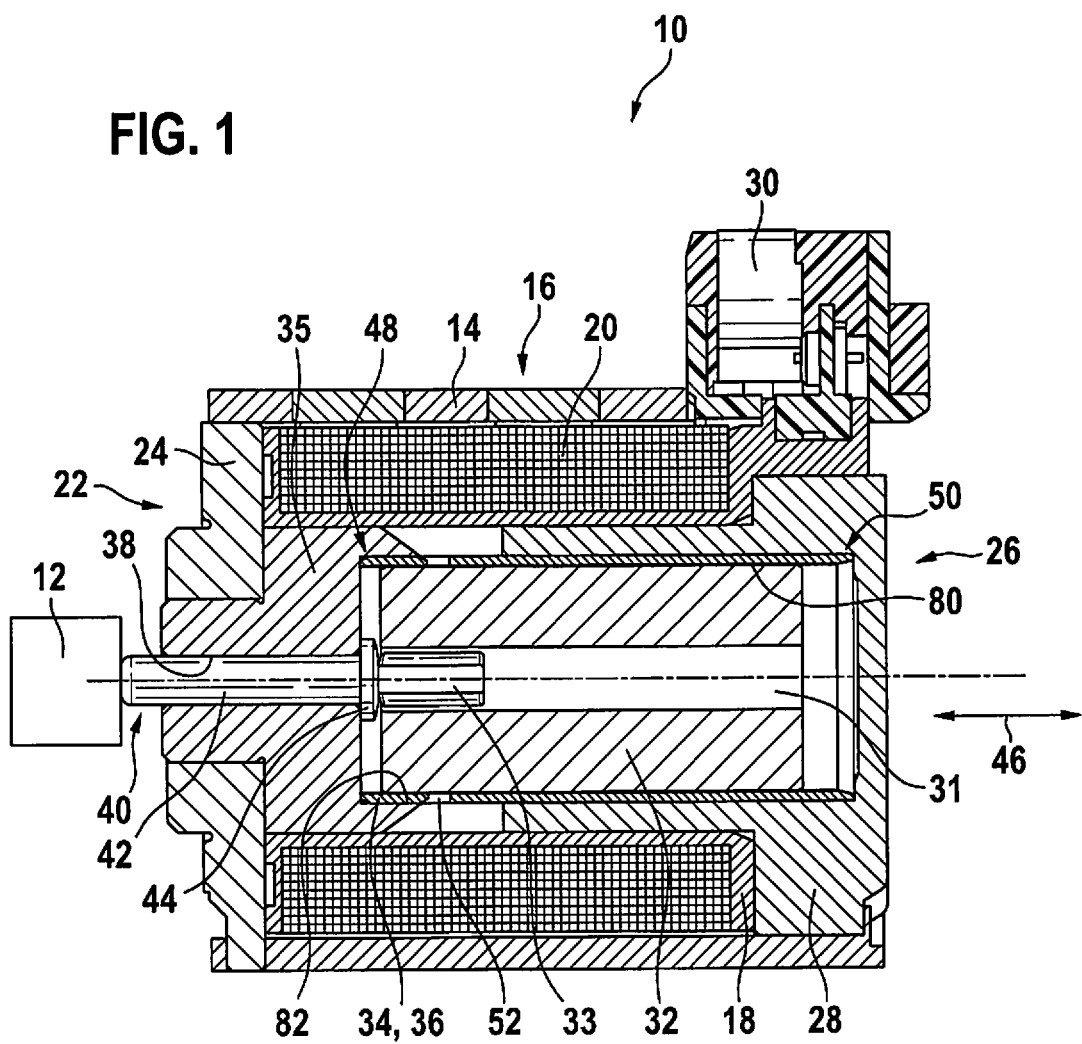
FIG. 1 shows a schematic section through an electromagnetic actuating device.

In FIG. 1, an electromagnetic actuating device is designated by reference character 10 as a whole. Such an electromagnetic actuating device 10 is used for example in transmission technology in motor vehicles, in particular in order to control a clutch of an automatic transmission.

Electromagnetic actuating device 10 has a housing 14 in which the components of electromagnetic actuating device 10 are situated. Electromagnetic actuating device 10 has an electromagnetic coil 16 that has a coil body 18 and a winding 20. At a first end face 22, housing 14 is closed by a terminating piece 24, which can be a flow plate. At a second end face 26, housing 14 is closed by a cover 28, which can be a magnetic core 28 having a segment extending into the interior of housing 14. In addition, on housing 14 an electrical contacting 30 is provided that is electrically connected to electromagnetic coil 16.

In addition, electromagnetic actuating device 10 has an armature (magnetic armature), a pole tube 34 (magnetic sleeve), and a pole core 35. Pole core 35 has a centric passage 38 through which an actuating element 40 is guided (actuating pin) that acts on hydraulic valve 12. Actuating element 40 can have a shaft segment 42 and a radially expanded head segment 44.

Armature 32 is situated radially inside pole tube 34. Radially outside pole tube 34, electromagnetic coil 16 is situated. Coil 16, armature 32, and pole tube 34 overlap one another at least partially along axial direction 46. Pole tube 34 has a first axial end 48 (facing pole core 35) and a second axial end 50 (facing away from pole core 35). Armature 32 has a centric axial passage 31 and, situated therein, an armature bolt 33 that actuates actuating element 40.

Pole tube 34 is realized as a stamped sleeve 36, brought into its shape by reshaping, sleeve 36 having openings 52 extending in the circumferential direction close to first axial end 48. Openings 52 may be formed as stamped openings 52 (stamped-out holes), that are directly formed in one working process during the stamping out of the basic material of sleeve 36. Pole tube 34, or sleeve 36, is shown by itself in FIG. 2.

Sleeve 36 is made of magnetically conductive steel, in particular magnetically conductive unalloyed steel having a carbon content of less than 0.15 mass percent. Sleeve 36 has a material thickness (sheet thickness) of less than 0.8 millimeters, in particular a material thickness of from 0.2 to 0.5 millimeters (material thickness after reshaping).

Sleeve 36 is rolled, and is thus brought into its substantially cylindrical or tubular shape by rolling, and at the same time is produced by stamping and rolling, a seam 58 resulting between the rolled free ends 54, 56 of the sleeve (seam ends). In specific embodiments that are not shown, the sleeve can also be shaped by deep drawing, as explained above.

(Rolled) sleeve 36 can optionally be latched at the (axially oriented) seam 58, and can thus have one or more latchings 60. Latching 60 can have a projection 62 at one contact end 56 of sleeve 36, and at the other contact end 54 of sleeve 36 can have a recess 64 that corresponds to, in particular is complementary to, projection 62.

Sleeve 36 has, at its first axial end 48, a recess 66 that is open towards first end 48 and that expands conically towards first end 48. Recess 66 goes out from one of the openings or stamped-out holes 52.

Figure 2A:
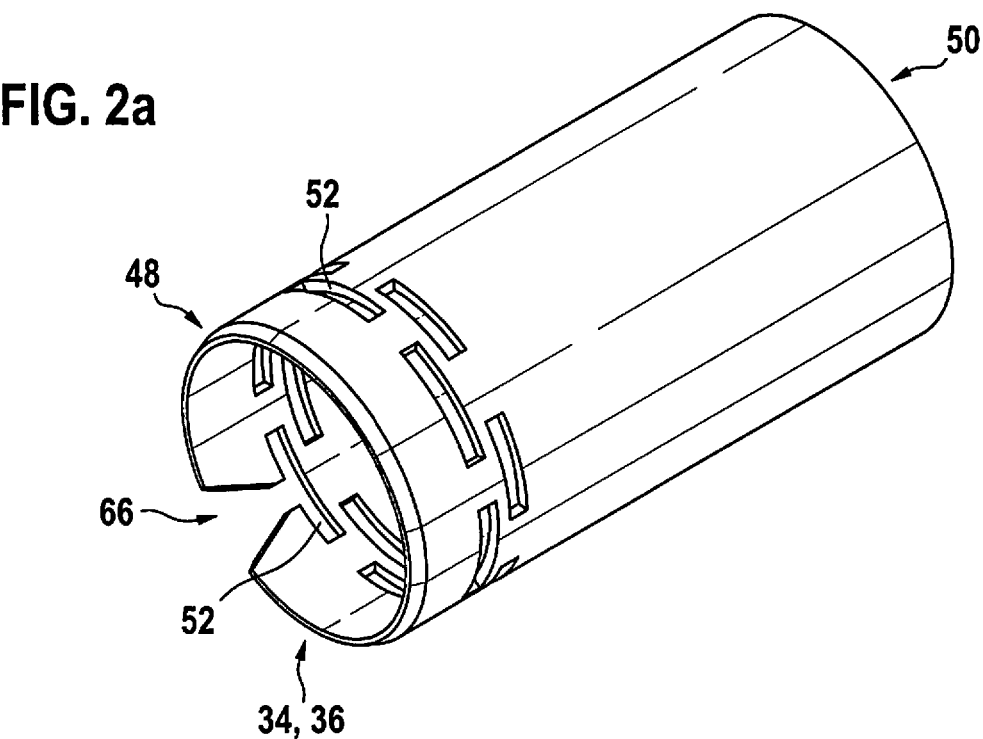
FIG. 2a shows the sleeve of the actuating device of FIG. 1 in a perspective top view (FIG. 2a).
Figure 2B:
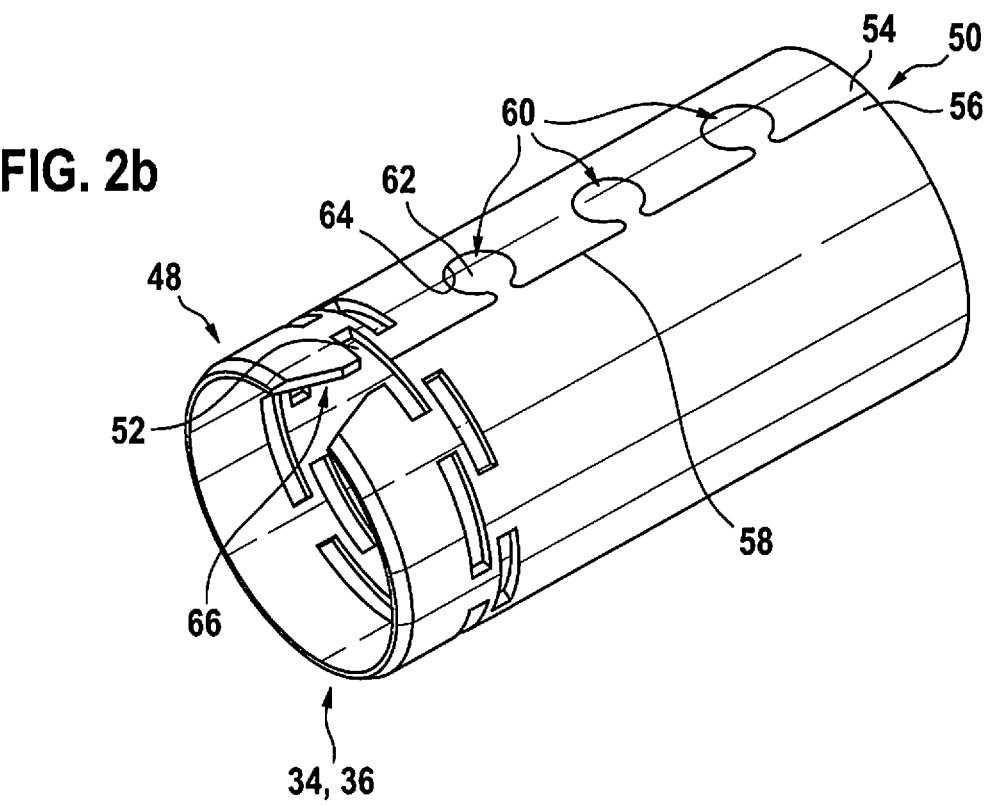
FIG. 2b shows the sleeve of the actuating device of FIG. 1 in a perspective rearview (FIG. 2b).

The openings, or stamped-out holes, 52 are configured in at least one, which may be in a plurality of rows in the circumferential direction (see FIGS. 2 and 3). Given a plurality of rows of openings 52, adjacent rows of openings 52 are configured offset to one another in the circumferential direction. This results in a plurality of magnetic bottlenecks 68 connected in series (see FIG. 3). The magnetic flux resulting from this is illustrated by arrows 70.

The length of openings 52 in the circumferential direction is at least 50% of the length of the web 72 remaining between two openings 52 following one another in a row (see FIG. 3). Openings 52 situated axially closest to first end 48 have, at the edge 74 of openings 52 facing first end 48, a stamped-in bevel 76, i.e. a conical bevel running axially inward from first end 48. Bevel 76 has a remaining wall thickness of less than 0.3 mm at the tip of the bevel.

Sleeve 36 has, on its inner circumference, a fiberglass foil 80 (see FIG. 1) coated with PTFE at least in some segments, which may be completely, for guiding armature 32. Alternatively, sleeve 36 can have on its inner circumference, or armature 32 can have on its outer circumference, at least in some segments and which may be completely, a magnetically non-conductive coating, in particular a nickel layer or a nickel-phosphorus layer.

Pole core 35 and sleeve 36 and armature 32 overlap one another axially. Pole core 35 has a recess 82 in which sleeve 36 and armature 32 engage axially at least partially and are guided thereat (guiding at first axial end 48). Pole core 35 can be realized in one piece, for example as a turned part.

Figure 4:
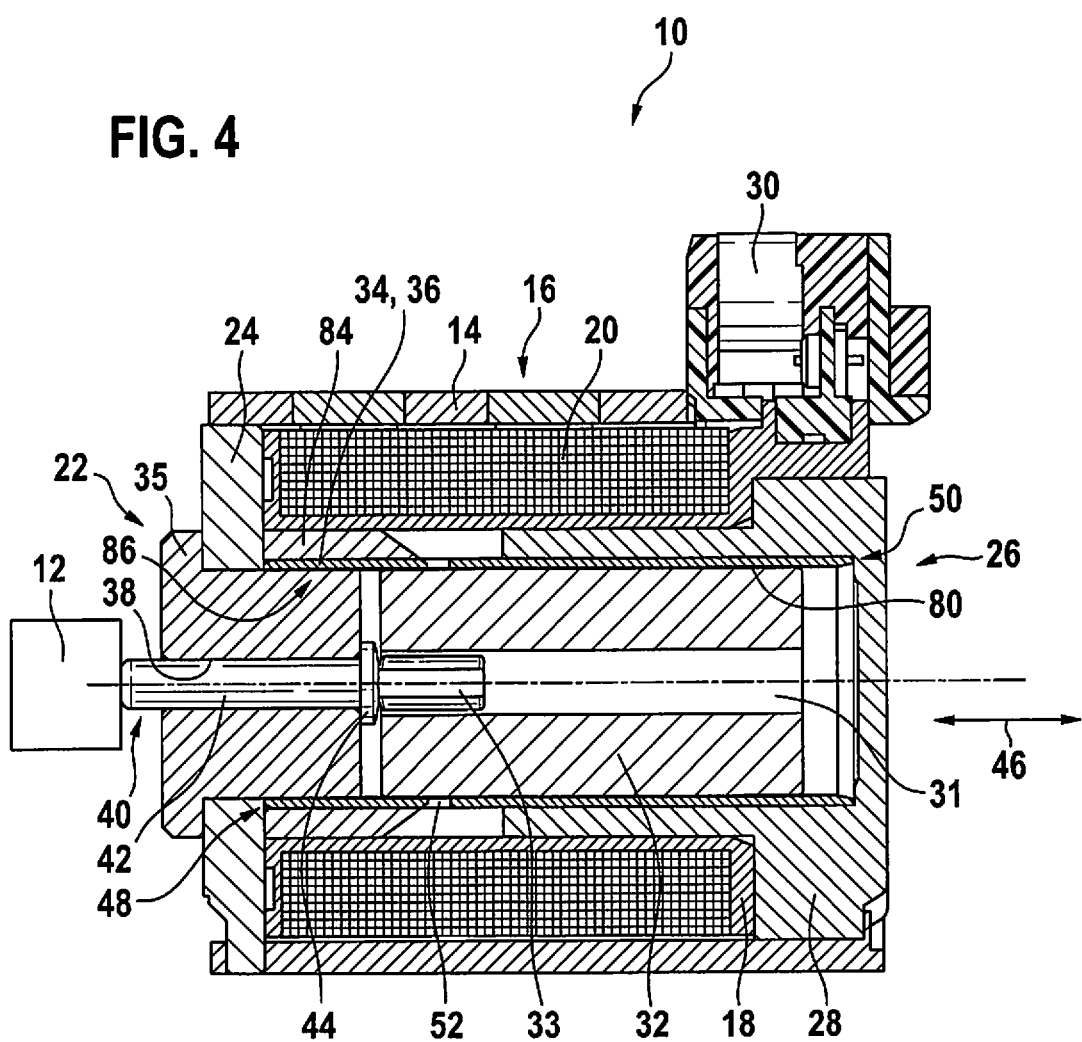
FIG. 4 shows a schematic section through a possible embodiment of the electromagnetic actuating device.

FIG. 4 shows an embodiment of the electromagnetic actuating device 10, which largely corresponds to the specific embodiment described above (identical or functionally identical elements have identical reference characters). In the embodiment according to FIG. 4, a pole core 35 is provided that has a separate pole sleeve 84 that is situated radially outside pole core 35 and that radially outwardly surrounds pole core 35 over an axial segment 86, at least in segments (multi-part construction; see FIG. 4). Sleeve 36 extends into axial segment 86, and is situated radially between pole core 35 and pole sleeve 84. In this way, a stable guiding of sleeve 36 and armature 32 at first axial end 48 can be achieved. Pole core 35 and pole sleeve 84 can easily be produced as separate elements, for example as stamped parts.

What is claimed is:

1. An electromagnetic actuating device, comprising:
a pole tube, which is substantially cylindrical overall;
an armature situated radially inside the pole tube so that the pole tube extends in a circumferential direction around the armature; and
an electromagnetic coil situated radially outside the pole tube;
wherein:
the pole tube has a first axial end and a second axial end;
the pole tube includes a sleeve that is stamped and is brought into its shape by reshaping;
the sleeve includes plurality of openings; and
at least one of the following two features (a)-(b):
(a) for each respective one or more of the plurality of openings, a respective length of the respective opening extends in the circumferential direction closer to the first axial end of the pole tube than to the second axial end of the pole tube; and
(b) at least some of the plurality of openings are arranged adjacent to each other in a single row, the single row extending in the circumferential direction.

2. The electromagnetic actuating device of claim 1, wherein the sleeve is made of magnetically conductive steel.

3. The electromagnetic actuating device of claim 1, wherein the sleeve is rolled or deep-drawn.

4. The electromagnetic actuating device of claim 1, wherein the sleeve has, at the first axial end, a recess that:
(a) extends axially in a direction towards the first axial end;
(b) forms an opening in an axial edge of the sleeve at the first axial end; and
(c) tapers so that the recess expands in the circumferential direction as it axially extends towards the first axial end.

5. The electromagnetic actuating device of claim 1, wherein the at least some of the plurality of openings are arranged adjacent to each other in the single row, the single row extending in the circumferential direction.

6. The electromagnetic actuating device of claim 1, wherein:
each of one or more of the openings includes:
a first opening edge; and
a second opening edge that is further from the first axial end than the first opening edge; and
the first opening edge is a beveled edge that forms a surface whose extension increases axially in a direction away from the first axial end with increased radially inward extension of the surface within a thickness of sleeve.

7. The electromagnetic actuating device of claim 6, wherein, at an edge of the bevel closest to the second axial end, a wall thickness of the sleeve is less than 0.3 millimeters.

8. The electromagnetic actuating device of claim 1, wherein the sleeve has on its inner circumference, and/or the armature has on its outer circumference, at least in segments or completely, a magnetically non-conductive coating.

9. The electromagnetic actuating device of claim 8, wherein the coating is a nickel layer or a nickel-phosphorus layer.

10. The electromagnetic actuating device of claim 1, further comprising:
a pole core, wherein the sleeve and/or the armature axially overlaps the pole core.

11. The electromagnetic actuating device of claim 10, further comprising:
a separate pole sleeve that radially outwardly surrounds the pole core over an axial segment, the sleeve of the pole tube extending into the axial segment and being situated radially between the pole core and the pole sleeve.

12. The electromagnetic actuating device of claim 1, wherein the sleeve has a material thickness of from 0.2 to 0.5 millimeters.

13. The electromagnetic actuating device of claim 1, wherein the sleeve has a material thickness less than 0.8 millimeters.

14. The electromagnetic actuating device of claim 1, wherein the sleeve is latched at a seam.

15. The electromagnetic actuating device of claim 1, wherein, for two immediately adjacent ones of the openings separated from each other by a web connection formed of a portion of the sleeve that separates the two immediately adjacent ones of the openings, respective lengths of each of the two immediately adjacent ones of the openings in the circumferential direction are at least 50 percent of a length of the web connection.

16. The electromagnetic actuating device of claim 1, wherein the sleeve is made of magnetically conductive unalloyed steel having a carbon content of less than 0.15 mass percent.

17. The electromagnetic actuating device of claim 1, wherein the pole tube, the armature, and the electromagnetic coil are axially positioned so that at least a portion of the electromagnetic coil overlaps at least a portion of the armature and overlaps at least a portion of the pole tube.

18. An electromagnetic actuating device comprising:
a pole tube, which is substantially cylindrical overall;
an armature situated radially inside the pole tube; and
an electromagnetic coil situated radially outside the pole tube;
wherein:
the pole tube:
has a first axial end and a second axial end; and
includes a sleeve that is stamped and is brought into its shape by reshaping; and
the sleeve:
includes openings that extend in a circumferential direction close to the first axial end; and
has a fiberglass foil that is coated with PTFE on its inner circumference at least in some segments or completely, for the guiding of the armature.

19. An electromagnetic actuating device comprising:
a pole tube, which is substantially cylindrical overall;
an armature situated radially inside the pole tube; and
an electromagnetic coil situated radially outside the pole tube;
wherein:
the pole tube:
has a first axial end and a second axial end; and
includes a sleeve that (a) is stamped, (b) is brought into its shape by reshaping, and (c) includes a plurality of openings close to the first axial end; and
at least one of the following:
(i) the openings are configured in a plurality of rows of openings, each of the rows extending in a circumferential direction of the pole tube; and
(ii) for two immediately adjacent ones of the openings separated from each other by a web connection formed of a portion of the sleeve that separates the two immediately adjacent ones of the openings, respective lengths of each of the two immediately adjacent ones of the openings in the circumferential direction are at least 50 percent of a length of the web connection.

20. The electromagnetic actuating device of claim 19, wherein the openings are configured in the plurality of rows of openings, each of the rows extending in the circumferential direction of the pole tube.

21. The electromagnetic actuating device of claim 20, wherein the rows include at least two adjacent rows, and the openings of one of the adjacent rows are, with respect to the circumferential direction, offset from the openings of the other one of the adjacent rows.

22. The electromagnetic actuating device of claim 19, wherein, for the two immediately adjacent ones of the openings separated from each other by the web connection formed of the portion of the sleeve that separates the two immediately adjacent ones of the openings, the respective lengths of the each of the two immediately adjacent ones of the openings in the circumferential direction are at least 50 percent of the length of the web connection.

* * * * *